United States Patent [19]

Fonne et al.

[11] Patent Number: 4,617,777
[45] Date of Patent: Oct. 21, 1986

[54] DOUBLE-WALLED PANELS WITH END CLOSURE

[75] Inventors: Gunnar J. Fonne, Eidanger; Finn Daae-Johansen, Tjodalyng; Per Thoresen; Stein-Arne Nilsen, both of Oslo, all of Norway

[73] Assignee: Vefi A/S, Larvik, Norway

[21] Appl. No.: 629,550

[22] PCT Filed: Nov. 4, 1983

[86] PCT No.: PCT/NO83/00047
§ 371 Date: Jul. 3, 1984
§ 102(e) Date: Jul. 3, 1984

[87] PCT Pub. No.: WO84/01687
PCT Pub. Date: May 10, 1984

[30] Foreign Application Priority Data
Nov. 4, 1982 [NO] Norway .................................. 823664

[51] Int. Cl.$^4$ .............................................. E04C 2/54
[52] U.S. Cl. ........................................ 52/802; 52/807; 428/119
[58] Field of Search ................ 52/782, 785, 790, 800, 52/807, 309.1, 802, 171; 428/119, 167, 188, 182

[56] References Cited
U.S. PATENT DOCUMENTS 1,617,274  2/1927  Romer .................................. 428/182
3,029,806  4/1962  Okuda .
3,068,565  12/1962 King et al. ............................ 52/800
4,035,539  7/1977  Luboshez ............................. 52/790
4,150,720  4/1979  Brackman .
4,172,749  10/1979 Leggett ............................... 428/119
4,206,748  6/1980  Goodman et al. .
4,290,413  9/1981  Goodman et al. .

FOREIGN PATENT DOCUMENTS 1930815  4/1970  Fed. Rep. of Germany .
2500015  8/1976  Fed. Rep. of Germany .
2719273  11/1977 Fed. Rep. of Germany .
2637914  2/1978  Fed. Rep. of Germany .
2850264  6/1979  Fed. Rep. of Germany .
  25221  1/1952  Finland ............................... 52/785
1485237  5/1967  France ............................. 52/309.1
 119087  3/1970  Norway .
1501084  2/1978  United Kingdom .

*Primary Examiner*—James L. Ridgill, Jr.
*Attorney, Agent, or Firm*—Wenderoth, Lind & Ponack

[57] ABSTRACT

A double-walled panel of transparent synthetic material for use in greenhouses and for similar purposes has opposite open ends closed by flanges. Before closing the ends, internal rib walls are recessed in such a way that transverse connections are formed in the closed double-walled panel through the rib walls, and through which a liquid medium may be distributed to individual channels of the double-walled panel.

2 Claims, 5 Drawing Figures

DOUBLE-WALLED PANELS WITH END CLOSURE

BACKGROUND OF THE INVENTION

The present invention relates to double-walled panels of transparent synthetic material for use in greenhouses and for similar purposes, particularly a double-walled panel made of transparent at least two parallel, separated sheets which are interconnected by means of ribs, with opposite open ends of the sheets being closed by lateral flanges formed by joining the sheets. It is common to refer to acrylic panels if the panels are made of polyacryl material, or to carbonate panels if the panels are of a polycarbonate material. In this text, these sheets will consistently be referred to as double-walled panels to draw attention to the internal construction.

In recent years it has become more and more common artificially to supply carbon dioxide to greenhouses to stimulate plant growth.

However, to have the full benefit of this procedure, the greenhouse cannot be ventilated. On hot sunny days, however, this will unfortunately result in a leaf temperature which exceeds the optimal temperature for plants, whereby the growth of the plants will be reduced. Consequently, the carbon dioxide cannot be utilized effectively in this way.

It is therefore known to fit vents in the roof of the greenhouses and to employ some kind of blind to prevent heat build-up in the greenhouse. However, if the vents in the roof are opened, the supply of carbon dioxide must be cut off. If an attempt is made to reduce the temperature in the greenhouse by shading the light surface, so much light will be removed that this will inhibit the growth of the plants. In other words, this is a vicious circle as either costs increase or growth is inhibited.

Several methods of solving the above problem have been suggested. One of these methods, which is relevant to the present invention, is to use a liquid medium, e.g. water, to filter off the infrared rays in sunlight.

Norwegian Pat. No. 118,047 describes a construction for use with a flat greenhouse roof, where a layer of water covers the transparent roofing material. However, greenhouses are not usually built with flat roofs in countries with snow fall in the winter, and therefore this construction is not suitable in these countries.

If double-walled panels of transparent synthetic material are used for greenhouses with sloping roofs, these make suitable sun filters when the channels between the ribs are filled with a liquid medium. Such use of double-walled panels is mentioned in West German Pat. Nos. 2,500,015; 2,637,914; 2,719,273 and 2,850,264, in which the open ends of the panel are closed by manifold tubes or manifold boxes supplying the liquid.

However, in practice it is extremely difficult to seal properly the connections between the manifold pipe and the open ended panel. The purpose of the present invention is therefore to provide a construction which eliminates the considerable weaknesses experienced by the use of manifold tubes or manifold boxes according to the above-mentioned West German patents.

SUMMARY OF THE INVENTION

Surprisingly, it has proved possible to close the open ends of the double-walled panels by exposing them first to heat treatment and then to compression, whereby there are formed manifold tubes which are integrated parts of the panel itself.

According to the invention, such construction preferably is achieved in that the narrow rib walls terminating the open ends of the double-walled panels are recessed or otherwise removed for a certain distance (a) inwards of the panel ends, yet leaving intact at least the two outermost rib walls which constitute the outward edges of the panel. Then the open ends of the panel are heated using normal appliances and methods, for instance by using hot air or infrared radiation, to a temperature suitable for the material, after which the open heated ends are pressed together over a certain width (b). As a result a permanent and sealed connection is formed externally, while the recesses in the rib walls provide open internal connection between the channels. Thus, the liquid medium is distributed over the entire cross-section of the panel. The inlet and outlet for the liquid are arranged in the panel in a per se familiar way, e.g. by fitting connecting sockets in the outer enclosing surfaces of one or both of the sheets.

The invention is characterized in accordance with the claims below.

BRIEF DESCRIPTION OF THE DRAWINGS

For a further understanding of the invention reference is made to the accompanying drawings, in which.

DETAILED DESCRIPTION OF THE INVENTION

Figure 1:
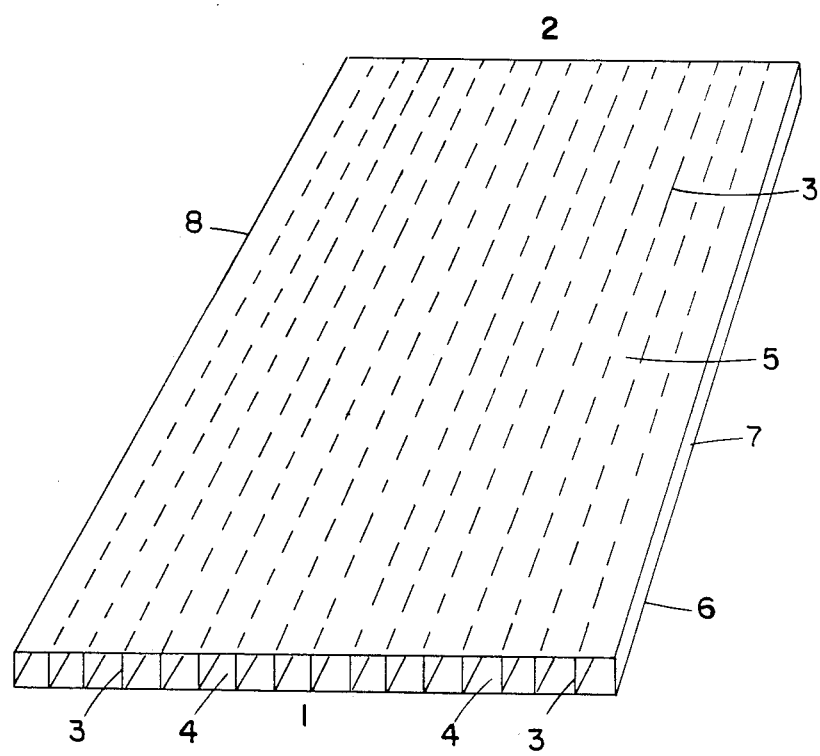
FIG. 1 is a perspective view illustrating an open-ended double-walled panel viewed obliquely from above.

FIG. 1 shows a double-walled panel of transparent synthetic material, where the open ends of the panel, forward (1) and rear (2), can be seen with, and with rib walls (3) defining channels (4). The panel has upper and lower sheets 5, 6 defining an upper surface and a lower surface, respectively, and lateral sheets 7, 8 defining lateral surfaces or edges of the panel.

Figure 2:
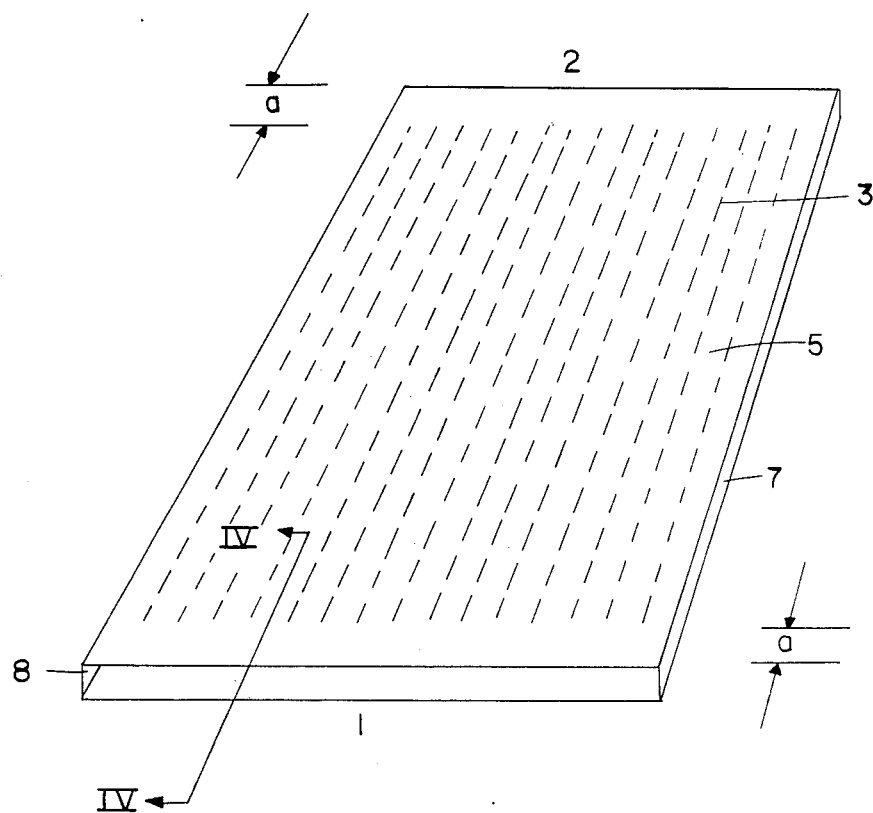
FIG. 2 is a similar view illustrating the same panel with rib walls thereof removed.

In FIG. 2, opposite ends of the rib walls (3) are removed for length (a). Therefore the rib walls (3) are not visible in the front of FIG. 2, but they are indicated by broken lines on the upper sheet (5). The rib walls (3) are removed by means of known techniques, e.g. cutting. If cutting is used, this can be done with a sharp-angled incision in the rib wall or it may be rounded off. A rounded incision is preferred due to the risk of fracturing when sharp angles are used.

Figure 3A:
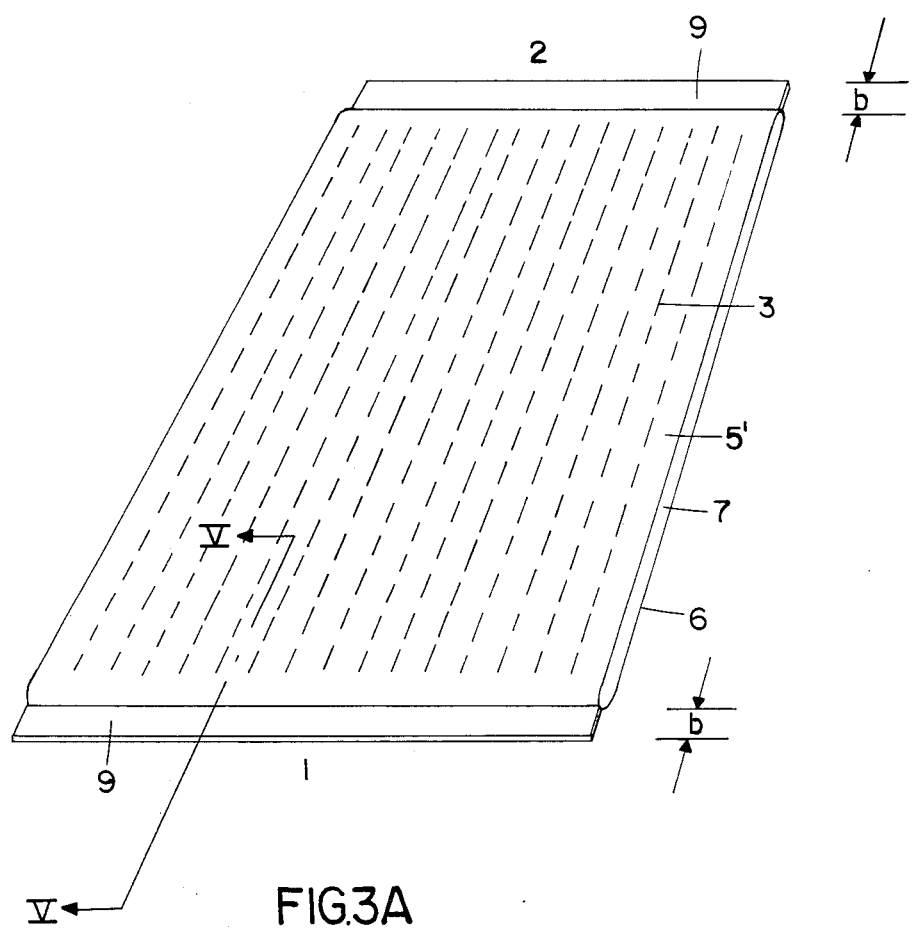
FIGS. 3A and 3B are similar views illustrating the panel after the open ends have been closed.
Figure 3B:
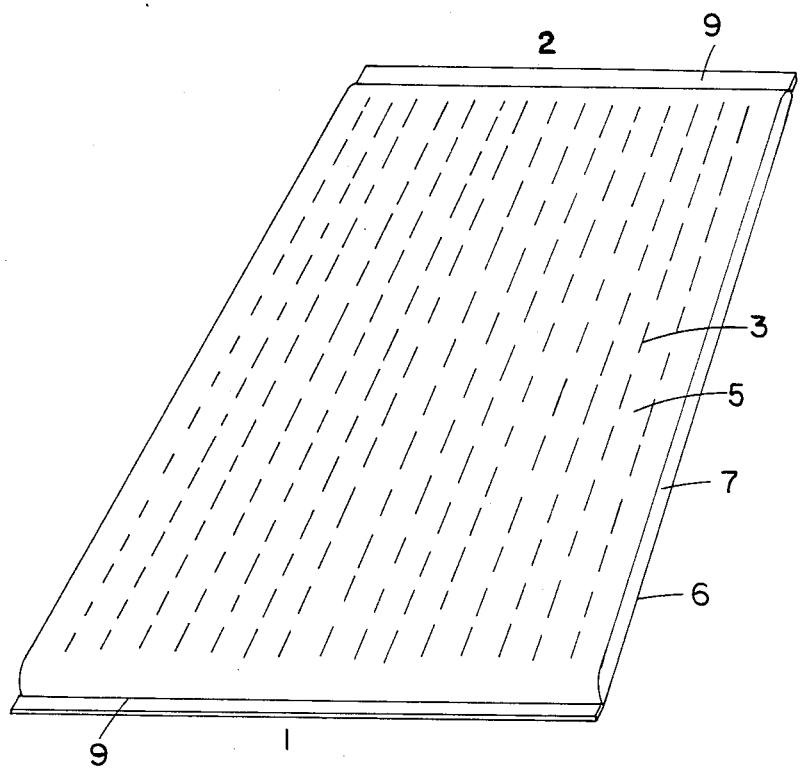

In FIG. 3A the panel is illustrated with the previous open sheet parts (1 and 2) closed with closed portion (9) being in the form of a flange extending transversely of the panel. It is possible to close the sheets (5 and 6) in such a way that the flange (9) is centered equally distant from sheets (5) and (6), or the flange (9) may form a direct elongation of the sheet (5) or the sheet (6). The flange (9) shall have a width (b) which is smaller than the length (a) of the cutout portions (10), as will be seen from FIGS. 4 and 5.

Figure 4:
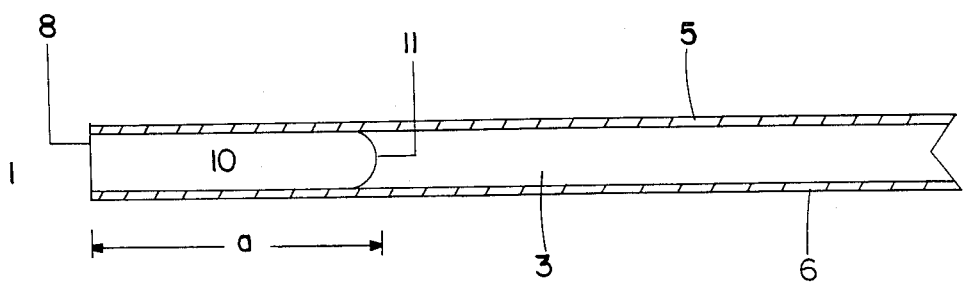
FIG. 4 is a cross-section through the panel along line IV—IV in FIG. 2.

FIG. 4 illustrates a section of the opening at forward end (1) of the panel along the line IV—IV in FIG. 2. The forward opening is defined by the upper surface sheet (5) and the lower surface sheet (6), and also by the lateral sheets (8), only one of which is seen. The rib walls (3) are shown recessed along length (a) by cutouts (10) formed by rounded incisions (11).

Figure 5:
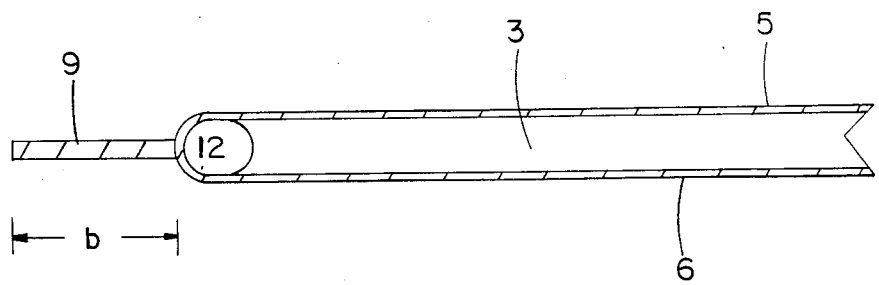
FIG. 5 is a cross-section along the V—V line in FIG. 3A after the open ends of the panel have been closed.

FIG. 5 shows a cross-section of the same panel along line V—V in FIG. 3A where the closure or flange (9) is formed by connecting the upper sheet (5) and the lower sheet (6). The cutout (10) now forms holes (12) in the rib walls (3) through which a liquid medium within the panel may be distributed over the entire panel.

With the present manner of closure of the upper and the lower sheets it has been possible to arrive at a simple and above all a practicable construction which makes it possible for the panel to be used as roofing material for greenhouses without having to alter the construction of the greenhouse.

We claim:

1. A double-walled panel formed of transparent synthetic material and for use in greenhouses and for similar purposes, said panel comprising:
    a pair of sheets of transparent synthetic material, each said sheet having opposite ends;
    a plurality of parallel ribs of transparent synthetic material positioned between said pair of sheets and defining therewith a plurality of longitudinal channels extending between opposite ends of said panel; and
    said ends of said sheets at each said panel end extending beyond respective ends of said ribs and being joined to form a flange extending transversely of said channels and closing said panel end, with said rib ends spaced from said closed panel end and thereby defining holes connecting adjacent ends of all of said channels.

2. A panel as claimed in claim 1, further comprising a liquid medium sealed between said sheets and freely distributable throughout the entire interior of said panel through said channeels and said holes.

* * * * *